Patented July 15, 1952

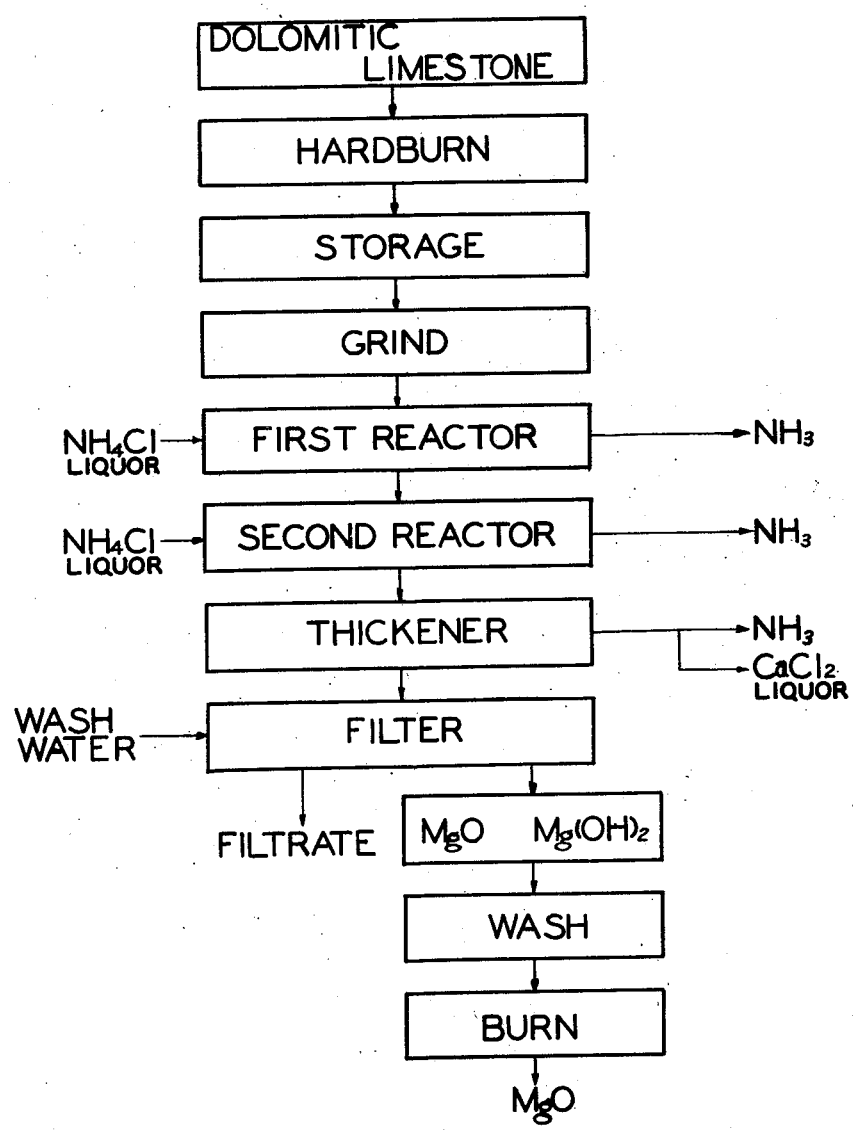

2,603,555

UNITED STATES PATENT OFFICE 2,603,555

METHOD OF OBTAINING MAGNESIA

Richard E. Hulme, Painesville, Ohio, assignor to Diamond Alkali Company, Cleveland, Ohio, a corporation of Delaware Application March 31, 1948, Serial No. 18,279

5 Claims. (Cl. 23—201)

This invention relates to the production of magnesia from dolomitic limestone and more particularly relates to a method of obtaining magnesia of high purity containing 2% or less of calcium oxide.

The invention, in general, contemplates the continuous treatment of dry, hard burned, fine ground dolomitic lime with ammonium chloride liquor in a plurality of reaction steps, which treatment effectively reacts and thus solubilizes substantially all of the calcium oxide, whereby it can be conveniently removed, while leaving the magnesia of the calcine substantially unhydrated and thus substantially unreacted with ammonium chloride. The ammonium chloride liquor employed in the method of this invention may conveniently be derived from any convenient source but is preferably recovered from the ammonia-soda process, particularly from the intermediate ammoniacal liquor obtained in that process from the sodium bicarbonate separation step, it being a feature of the invention so to treat such liquor as to make it available for use in the process. However, any ammonium chloride solution of relative purity, particularly with respect to carbon dioxide and ammonia, may suitably be used, if desired.

It has heretofore been proposed to obtain pure magnesia by treatment of dolomite with ammoniacal liquor from the ammonia-soda process. It has, for example, been proposed to react calcined dolomite with such ammoniacal liquor, using only so much liquor as is required to react the lime of the calcine, leaving the remaining portion of the calcine comprising magnesia unreacted upon the completion of the treatment of the calcium oxide contained in the calcine. The liquor proposed to be used in accordance with these prior teachings, however, in some cases contains substantial quantities of ammonium carbonate, the carbonate portion of which ultimately causes precipitation of calcium carbonate, thereby raising the ultimate calcium contamination of the finished product. Furthermore, as a matter of practice, these prior disclosures have amounted at best to teachings lacking the means of actual application since at the present time, no way of following this general proposal, which results in a pure magnesia having a calcium content of the order of 2% or less, is known. This is true in particular where the liquors employed have not been freed of ammonium carbonate.

Other workers in the prior art have appreciated the necessity of removing ammonium carbonate from the ammonium chloride containing filtration liquors from the bicarbonate filters of the ammonia-soda process prior to using such liquors for the purpose of solubilizing the calcium oxide content of a burned dolomite to obtain relatively pure magnesia and to this end have taught to heat or otherwise treat such liquors to eliminate the ammonium carbonate therefrom prior to employing the liquors. These prior suggestions have also failed to achieve the end of obtaining from dolomite a magnesia having but tolerable amounts of calcium oxide, such as less than 2% thereof, principally because the prior workers have failed to appreciate the significance of the content of such liquors of a substantial proportion of free ammonia, the removal of which is not accomplished by the prior proposed steps of removing ammonium carbonate, and the presence of which inevitably results in raising the ultimate calcium content of the product well above the tolerable limit of 2% into the range of 5–7%, as will more particularly be pointed out hereinafter.

In order to overcome some of the difficulties involved in the general proposals of the prior art, it has also heretofore been proposed to hard-burn dolomite to a point where substantially all of the carbon dioxide is removed, that is, to the so-called dead-burned condition, prior to treating it with ammonium chloride solution. According to this proposal, the thus burned material is then treated with an ammonium chloride solution of a strength from 10% to 15%, just sufficient ammonium chloride being added to react with the calcium oxide present and not any with the magnesium oxide present, it being stated according to this proposal that the reaction rate of calcium oxide with ammonium chloride far exceeds in velocity that between magnesium oxide and ammonium chloride. By these means a magnesium oxide containing of the order of 10% of calcium oxide is claimed to have been obtained. While such a product may have uses in the arts, it has only been obtained by use of made up ammonium chloride liquors, the expense of which far exceeds that of properly purified bicarbonate filter liquor from the ammonia-soda process.

In addition, a calcium oxide content of the order of 10% distinctly limits the applicability of the material as a refractory and requires the combination with the material of fluxing ingredients to stabilize the calcium oxide remaining with the magnesia. Refractory brick fashioned from magnesium oxide containing as high as 10% of calcium oxide is highly sensitive to spalling and deformation in service, especially at the high temperatures normally encountered in such processes as are carried on in the basic open hearth furnace and the like. In addition, the presence of as much as 10% of calcium oxide in the completely processed magnesia limits the use of the magnesia in other applications where high purity is desired.

A principal object of the present invention is to produce a magnesia from dolomitic limestone having calcium oxide equal to 2% or less therein, whereby particularly when this material is used as a refractory base material for high quality magnesia refractory brick or magnesia chrome brick or the like, the minor percentage of calcium oxide remaining exists only in solid solution in the periclase or highly dense form to which the magnesia after separation may be reduced by heat treatment. Refractory brick formed from such magnesia, to which has been added, if desired, a small amount of silica in order to form fosterite, which serves as a matrix or bond for the periclase crystals, is characterized by substantial absence of spalling and deformation in service and absence of formation of low melting spinels, it being entirely unnecessary to add fluxing materials to stabilize the small amount of calcium oxide remaining with the magnesia. Accordingly, the product of the present method differs entirely from products of the prior art methods in which the calcium oxide content remains as high as 10%.

A further important object of the present invention is to employ the filter liquor from the bicarbonate filters of the ammonia-soda process as the solubilizing means for the calcium content of the burned dolomite and to that end properly to treat said liquors prior to use in order to remove therefrom not only carbon dioxide in any form, and ammonium carbonate, but also free ammonia whether dissolved in the solution or existing originally therein as ammonium hydroxide.

In accordance with the present invention, it has been found that a dolomitic limestone may be treated to obtain therefrom magnesium oxide containing less than 2% of calcium oxide, which by subsequent heat treatment may be converted into the dense, hard periclase form of the oxide which is suitable for many and varied refractory uses. In addition, the pure magnesia obtained by the present method may be used for various other applications in the chemical arts, as will be well-understood.

The method of the present invention contemplates generally the provision of a hard or dead-burned dolomite, the burning being carried to a temperature of at least 2600° F., though higher temperatures of burning may be employed. This hard-burned dolomite may be stored suitably for a more or less indefinite period of time after burning so long as the subsequent grinding to be described below is not resorted to. Once the grinding, which is preferably to the extent that 98% of the material passes a 100 mesh screen has been accomplished, then storage time becomes quite critical and storage even out of contact with air for a period of more than 4-5 hours is found considerably disadvantageous to the ultimate low calcium content of the magnesia products.

The so-burned and ground dolomite is preferably fed dry to a reaction vessel, where it is contacted with ammonium chloride liquor, the temperature of the ammonium chloride liquor in this reaction vessel being initially of the order of 80° F. or less and the temperature in the reaction vessel being maintained at all times below 160° F. In this reactor, most of the calcium oxide is hydrated to calcium hydroxide and some converted to calcium chloride; substantially none of the magnesium oxide is chemically affected at all. The slurry of materials obtained from the first reactor is sent to a second reactor, where the temperature is not as critical and may rise above 160° F., in fact, preferably does rise above this temperature in order to complete the reaction between ammonium chloride and the remaining calcium oxide, as well as calcium hydroxide to produce calcium chloride. Upon the completion of the reaction in the second reactor, a separation may be made between the liquor containing soluble calcium chloride and the insoluble magnesium oxide-magnesium hydroxide mixture. After suitable concentrating, washing, filtering and the like, a magnesium oxide-magnesium hydroxide precipitate is obtained which is substantially 98% plus in magnesium measured as magnesium oxide and contains less than 2% of calcium oxide.

The ammonium chloride liquor employed may suitably have a concentration of the order of 5–20% in ammonium chloride but preferably contains of the order of 10% to 15%. This solution may be derived from any convenient source but, as has been mentioned heretofore, is most economically and practically taken from the bicarbonate filter liquor of the ammonia-soda process. Such liquor originally contains, in addition to ammonium chloride, carbon dioxide, ammonium carbonate, bicarbonate, and free ammonia, other non-volatile, non-active impurities, such as sodium chloride, which are of no interest as they do not affect the use ultimately to be made of the liquor. In order that ammonium chloride liquor from such source may be used in the practice of the present invention, however, it is necessary that all carbon dioxide and carbon dioxide yielding substances be removed and additionally that all ammonia as free ammonia be also removed. Removal of ammonium carbonate, carbon dioxide, and the like is easily accomplished by heating the liquor to remove ammonium carbonate as taught by the prior art. This treatment, by removal particularly of carbon dioxide, also effects a reversal of the reaction by which bicarbonates are formed in the ammonia-soda process, whereby ammonium and sodium bicarbonate are substantially eliminated. Free ammonia, however, is not taught to be removed by this prior art treatment and particularly the necessity for its removal and means for accomplishing the same were not appreciated prior to this invention.

Once the necessity of free ammonia removal is appreciated, the accomplishment thereof is relatively simple. In accordance with the present invention, following the removal of carbon dioxide from the liquor by heating the same to break down ammonium carbonate, the liquor is subjected to a further stripping step, which may, if desired, be accomplished in a stripping tower or the like as is well-understood in such operations, to remove therefrom substantially all free ammonia contained in the solution, whereby the liquor as employed in the process of the present invention contains, as its only active ingredient, ammonium chloride.

The present invention may be more readily understood by reference to the accompanying flow-sheet in which the various steps of the preferred form of the method are set forth. Thus, a dolomitic limestone, which may have any suitable particle size, such as average ¾" by ⅜" diameter, and containing as its principal constituents, calcium carbonate and magnesium carbonate, preferably containing a very small amount of $SiO_2$ of the order of 0.2%, is burned in any suitable burning device, such as a rotary or vertical kiln, at a temperature of at least 2600° F., which temperature may rise to as high as 3200° F., the essential purpose of the burning to be to remove substantially all of the carbon dioxide in the dolomite. Accordingly, the burning is continued until as little as 0.2% by weight of carbon dioxide remains in the burned dolomite. Such hard-burning has the additional advantageous effect of inactivating the magnesium oxide, whereby the formation of gelatinous $$Mg(OH)_2 \cdot xH_2O$$

in subsequent steps, which gelatinous material would coat the calcium hydroxide and thus prevent its reaction to calcium chloride, is accordingly inhibited. The stone after burning may be stored relatively indefinitely without any deleterious effect arising from the storage time.

When, however, it is desired to proceed with the further steps of the method, the burned stone is ground to a degree of fineness of the general order of that which will enable 98% of the material to pass through a 100 mesh sieve. As noted above, after this grinding, storage may no longer be resorted to for indefinite periods and furthermore, the material must be kept out of contact with air and water vapor in order to avoid air slaking and in addition, in order to avoid settling of the material and packing prior to further treatment. Exposure to air, water vapor or the like at this point has been found to have a disadvantageous effect upon the action of the material in later steps of the method, the ultimate effect of which is to increase the calcuim oxide content of the final product. In particular, it has been found that sufficient air slaking occurs and moisture is picked up by the ground material when stored for more than five hours in ground form, so that upon subsequent treatment with ammonium chloride liquor, the formation of curds and balls of material in the reactor occurs, which curds and balls have a highly hydrated surface comprising mainly gelatinous $Mg(OH)_2 \cdot xH_2O$ and substantially unhydrated centers. These unreacted materials continue through the reactions to the settling step, wherein calcium contamination results since all of the calcium content has not been reacted to the soluble calcium chloride. Furthermore, these unhydrated, unreacted materials have a physical form which renders the settling operation one of great practical difficulty resulting in considerable hold-up of materials processed, low yields, and thus general overall inefficiency. Accordingly, storage periods of the order of five hours or less are recommended at this step of the method and storage of the order of one hour or less is preferred. Moreover, the feature of storage in fine ground form while preferably employed in conjunction with the other steps of the process described herein, is in and of itself an important and significant feature of the present invention.

Accordingly, as soon as is convenient from the standpoint of process operation after the burned material has been ground to a point where 98% will pass a 100 mesh sieve, the material is introduced in dry form into the first reactor, which reactor is preferably previously charged with a suitable quantity of ammonium chloride liquor having a concentration of between 10% and 15% ammonium chloride therein, the ammonium chloride liquor being preferably maintained at a temperature below about 80° F. It will be appreciated that in a batch operation, the ground burned material may suitably be introduced into any convenient vessel containing ammonium chloride liquor of the type mentioned above and the slurry may be removed from the batch reactor in any convenient manner. In a continuous operation on the other hand, it is preferred to provide means for continuous introduction of both the burned material and the ammonium chloride liquor into a reactor together with a bottom removal device for withdrawing the slurried calcined material. In any case, however, the maintaining of the temperature below about 160° F. is highly desirable at this point in the reaction and may suitably be accomplished under most conditions by precooling the ammonium chloride liquor to below about 80° F.

It will be appreciated that by operating with dry calcined dolomite directly into the ammonium chloride liquor, a considerable amount of ultimate dilution is avoided which would be necessary in the event that the lime were first hydrated before being introduced into the ammonium chloride liquor reaction vessel. An additional advantage arises from the treatment of the dry calcined material in that where initial hydration even of hard-burned dolomite is resorted to, some hydration of MgO to $$Mg(OH)_2 \cdot xH_2O$$

occurs, which material as noted above is of a slimy character and tends to coat calcium oxide in the calcine and prevent its hydration. Such coated material shows up in the ultimate product as an appreciable impurity and is avoided by the method of this invention. On the other hand, however, the advantages which arise from the feeding of dry material into the ammonium chloride liquor have not heretofore conveniently been obtained because introduction of the burned dolomite into ammonium chloride liquor results in considerable heat of hydration being evolved together with considerable bubbling and frothing of the solution, particularly caused by the release of gaseous ammonia. It will be appreciated that in combining a very finely powdered material with a solution which is bubbling and frothing, considerable stabilization of the foam will result from the fine solid material entering the reactor and accordingly, the fine material will not be properly wetted, whereby proper contact between particularly the calcium oxide of the ground material and the ammonium chloride liquor does not take place.

Furthermore, both as to material not properly wetted and as to material which does undergo reaction, it has been found that at temperatures much in excess of 160° F., the physical form of the reacted material is such that crystal growth of a kind to simplify the subsequent settling step does not take place and accordingly, materials derived from runs where higher temperatures in the first reactor obtain has been found subsequently to present substantially the same settling problems as are presented by the air slaked calcined material as hereinbefore discussed.

These difficulties are avoided in the present invention and it is a feature of the present invention that the temperature in the first reactor is maintained sufficiently low, preferably lower than about 160° F. and suitably between 150° F. and 155° F., to prevent any substantial boiling off of ammonia in the first reactor, whereby frothing is minimized and no stabilization of foam can be had by the entering finely divided solids and further to enhance proper crystal formation and thus, eliminate subsequent settling problems. Hence, not only is excess water and thus excess dilution, as well as coating of calcium oxide which prevents its hydration, avoided by this method but also the heat of hydration heretofore believed to be a disadvantage in such a reaction is relied upon in the present invention as a means of supplying a controlled heating of the first reactor and to aid in completing the reaction in the second reactor, whereby the application of heat from other sources is thus unnecessary.

By this method of operation, however, and particularly by avoiding the boiling off of ammonia in the first reactor, the necessity of preventing an excess of ammonia particularly in this reactor is emphasized. Thus, if ammonia in the form of free ammonia, as well as in the form of ammonium chloride, were introduced into this reactor, the presence of the excess ammonia would tend to establish an equilibrium between the calcium oxide or hydroxide and the ammonium chloride, which would tend to favor the existence of calcium hydroxide in the reactor as such, rather than to favor the running of the reaction to calcium chloride and ammonium hydroxide. This, it will be appreciated, is in accordance with mass action principles which dictate that unless a product of metathesis is removed from the scene of reaction, an equilibrium will result and as a corollary thereto, if a product of metathesis is present in excess, the presence of such excess material will tend to favor the establishment of such equilibrium and incomplete reaction will result. Accordingly, the significance of complete removal of undesired impurities in the bicarbonate filtrate liquors can be appreciated; not only must carbon dioxide be removed, lest it appears in the final product as insoluble calcium carbonate, but also free ammonia must be removed from the liquor prior to its use in order to avoid the mass action effect, principally in the first reactor, which results in incomplete reaction of the calcium constituent.

The stripping out of the ammonia moreover has an additional effect in the process. As noted above, unless the temperature in the first reactor is reasonably strictly maintained, considerable frothing of ammonia will occur, the froth being stabilized by the solids entering the first reactor. Obviously, if free ammonia is present in the liquor into which the burned material is introduced, considerably more frothing will occur since considerably larger quantities of gas will be released in this reactor. Accordingly, it is of added importance to be certain that all free ammonia in the entering liquor is stripped out prior to its introduction into the first or second reactor.

After a time of maintenance in the first reactor of the order of 8 or 10 minutes, during which time the material in the reactor is agitated vigorously to enhance contact of materials and thus the desired reaction, the slurried material, wherein the calcium oxide is partially hydrated to calcium hydroxide and wherein the magnesium oxide is substantially unhydrated at all, is removed to a second reactor. In a batch operation this procedure may very easily be had, no filtering or other separation of liquor from the slurried material being desired at this point. In a continuous operation a bottom dump of the first reactor and a suitable pump system for flowing the slurry to the second reactor represents a convenient means for accomplishing this step.

Similarly to the first reactor, the second reactor is provided with vigorous agitation by any convenient means. A suitable quantity of ammonium chloride liquor also stripped of carbon dioxide and free ammonia in the event that the liquor is derived from the ammonia-soda process, is provided in this reactor. The temperature, however, at which this ammonium chloride liquor is maintained in the second reactor is by no means as critical in the second reactor as in the first reactor, since no dry material goes into the second reactor, the material already having been slurried in the first reactor, and further since the problem of formation of non-settling precipitates has been largely eliminated by the treatment in the first reactor. Furthermore, a higher temperature is advantageous in the second reactor in order to complete the reaction of calcium oxide to calcium hydroxide and to complete the reaction between calcium hydroxide and ammonium chloride to give calcium chloride and ammonium hydroxide which breaks down to ammonia and water, the ammonia being removed at the temperature of this reactor and thus, the normal equilibrium being disturbed and complete reaction to calcium chloride being encouraged since the calcium chloride is soluble under the conditions described herein and thus easily separated from the slurry. Accordingly, temperatures well in excess of 160° F. and as high as 210° F. may be had in the second reactor with no deleterious effect upon the final purity of the magnesium oxide product to be obtained.

At the end of 8 or 10 minutes in the second reactor, the entire amount of lime in the original charge has been hydrated to calcium hydroxide and substantially all of the calcium hydroxide has been reacted to calcium chloride. On the other hand, the magnesium oxide has only been hydrated to the extent of perhaps 30% or more in the two reactions and in any event, particularly in view of temperature control in the first reactor, is in a relatively non-gelatinous, easily filterable form comprising a mixture of MgO and $Mg(OH)_2$, substantially no $Mg(OH)_2 \cdot xH_2O$ having been formed. It will also be appreciated that in the second reactor, as well as to a minor extent in the first reactor, considerable free ammonia is evolved which may be returned, if desired, to the ammonia-soda process for use, whereby considerable saving in ammonia is effected.

Upon completion of the reaction in the second reactor, the slurry is sent to a thickener wherein the $Mg(OH)_2$ is permitted to settle and the clear solution of calcium chloride may be separated by decantation or any other suitable means. Ammonia may be stripped either from the slurry in the second reactor or subsequently from the removed calcium chloride solution and returned, as noted above, for use in the ammonia-soda process. Any suitable washing steps may be employed to concentrate and wash the remaining slurry of magnesium hydroxide and oxide. These steps will depend to some extent upon what is to be done with the product when finally freed of solution by filtering, washing or other convenient means. One suitable means of washing the product is by counter-current flow with the wash water in a series of vessels to which the magnesia slurry is successively pumped. The magnesium oxide-hydroxide mixture obtained by these means consistently is of the order of less than 2% in calcium as calcium oxide and especially where the ammonium chloride liquor has been substantially free of ammonia, may be of the order of 0.5% or less. The recovered material thus is suitable for further treatment, as by burning at high temperatures, to form periclase granules, which may ultimately be converted into high grade refractory materials, or it may be used for the formation of pure magnesium chemicals or for many other uses which will occur to those skilled in the art.

The following specific examples of preferred means of practicing the present invention are offered to acquaint those skilled in the art more particularly of the practice of the method, it being understood, however, that the examples are merely illustrative and are not to be understood as limiting in any way whatsoever the breadth of the invention herein.

Example I 312.5 grams of previously hard-burned dolomitic limestone containing before calcining approximately 21.5% MgO, 29.7% CaO, 48.4% $CO_2$, and less than 0.1% of impurities, such as $SiO_2$, $Al_2O_3$ and the like, which have been burned at a temperature in excess of 2600° F. until less than 0.25% $CO_2$ remains therein, are treated with 1000 cc. of liquor comprising ammonium chloride solution from the bicarbonate filtering step of the ammonia-soda process and from which free ammonia and carbon dioxide have been completely removed, the concentration of $NH_4Cl$ being of the order of 10% and the entering liquor having a temperature of the order of 70–80° F., which rises to as high as 160° F. during the 15-minute contact between the stone and the 1000 cc. of liquor. After 15 minutes of agitation, the liquor is decanted from the slurry and the slurry is then treated with 1500 cc. of further liquor of the same character as described above for a contact time of 15 minutes and within a temperature range of 186–192° F. After the second treatment, the magnesium hydroxide-oxide combination settles rapidly, leaving a decantable volume of liquor of 720 cc., having a calcium chloride concentration of 132.9 grams per liter. Upon suitable washing, thickening, and finally filtering, the precipitate obtained is found to be substantially entirely pure magnesium oxide and hydroxide, the calcium oxide content by analysis being 1.71%.

Example I, set forth above, describes a small scale batchwise procedure by which the present invention may be practiced. For commercial operations, a continuous operation will be much more desirable and in order to acquaint those skilled in the art of the nature of such continuous operation, the following example is offered:

Example II

Hard-burned dolomitic lime of the same pre-burned analysis as in Example I and containing less than 0.25% $CO_2$ after burning is ground to a fineness whereby 98% thereof passes a 100 mesh sieve and is continuously introduced at a rate of 515 lbs. per hour into a closed reactor, the introduction of the ground burned stone being carried out within about one hour to 1½ hours of the time that the stone is ground. At the same time ammonium chloride liquor from the ammonia-soda process, previously stripped of $CO_2$ and ammonia and having a concentration in ammonium chloride of 159 grams per liter and residual free ammonia of 2.5 grams per liter (together with 95.5 grams per liter of salt), is introduced into the same reactor at the rate of 1935 lbs. per hour along with 460 lbs. per hour of water, with agitation and at an introducing temperature of 59° F. A retention time of about 8 minutes is had in this first reactor and the temperature is maintained at below 149° F., whereby reaction occurs evenly and smoothly with the powdered material, mixing readily with the liquor and being relatively immediately wetted thereby. The slurry is withdrawn from the bottom of the reactor at the rate of 2900 lbs. per hour while a small quantity of vapors from the reactor are drawn off and sent ultimately to a condenser for further utilization. The slurry is pumped into a second reactor at a temperature of the order of 145° F. and ammonium chloride liquor similarly stripped in an amount of about 1950 lbs. per hour is introduced into this reactor together with 750 lbs. of water and steam. A considerably larger quantity of vapors of water and ammonia are withdrawn from the reaction taking place in the second reactor and sent to condensers for reuse. The temperature in the second reactor is maintained at about 161° F. and higher, steam being introduced in order to maintain the higher temperature. After a retention time of 10 minutes, the slurry is removed at a rate of 5491 lbs. per hour from the second reactor and sent to settling tanks, wherein the temperature gradually falls off at a natural rate; clear calcium chloride solution is withdrawn from the tanks. Residual ammonia is distilled from the decanted calcium chloride solution, the ammonia being sent to the same condenser for further utilization. The magnesium oxide-hydroxide mixture remaining in the settling tanks is suitably washed with water to remove soluble salts at about 80° F., a counter-current decantation system being employed, and separated from the wash water by any suitable filtering means, such as filter wheels or the like. The calcium oxide content of the ultimate product consistently remains below 2%, and in this example was, 0.44%.

While there have been described in detail certain forms of the invention and certain specific examples of its practice, the invention is not to be understood as being limited to such examples as it is realized that changes within the scope of the invention are possible, and it is further intended that each step in the following claims shall refer to all equivalent steps for accomplishing the same result in substantially the same or equivalent manner, it being intended to cover this invention broadly in whatever form its principle may be utilized.

What is claimed is:

1. The method of separating magnesia from dolomite which includes the steps of burning dolomite until its carbon dioxide content is less than 0.25%, feeding said burned dolomite to a carbon dioxide and free-amonia free ammonium chloride solution, while maintaining the temperature of said solution below 160° F. to wet said dolomite and hydrate the lime thereof, separating a slurry of hydrated calcium oxide and substantially unaffected magnesium oxide from said ammonium chloride treatment, contacting said slurry with further similarly pure ammonium chloride solution at a temperature within the range of 160° to 210° F. to completely react the calcium thereof to calcium chloride, and recovering magnesia substantially free of calcium from said second ammonium chloride treatment.

2. The method of separating magnesia from dolomite which includes the steps of calcining a dolomite until less than 0.25% carbon dioxide remains therein, fine grinding said dolomite, dry feeding said ground dolomite to a carbon dioxide and free-ammonia free ammonium chloride solution having a concentration of ammonium chloride of the order of 10–15%, and at a temperature of about 80° F., maintaining the temperature of the mixture below 160° F., separating a partially hydrated slurry from said system, reacting said slurry with further ammonium chloride solution of like concentration and purity at a temperature in excess of 190° F. until the calcium of said slurry is substantially reacted to calcium chloride, and recovering substantially calcium-free magnesia from said reaction.

3. The continuous process of recovering magnesia of high purity from dolomite which includes the steps of burning dolomite at temperatures in excess of 2600° F. until its carbon dioxide content is less than 0.25%, continuously grinding said burned dolomite to fine pulverulent form, continuously contacting said ground burned dolomite with ammonia and carbon dioxide free ammonium chloride solution in an amount insufficient to hydrate the magnesium oxide thereof, maintaining the mixture of ground burned dolomite and ammonium chloride solution at a temperature below 160° F., continuously recovering a mixture of partially reacted lime and magnesia from said treatment, continuously contacting said mixture with further ammonium chloride solution at a temperature in the range of 160° to 210° F., and recovering calcium chloride solution and solid magnesia substantially free of calcium.

4. The method of claim 3 which includes the steps of continuously providing ammonium chloride liquor containing free ammonia and carbon dioxide, stripping said free carbon dioxide and ammonia from said ammonium chloride liquor containing the same, and continuously contacting said ground burned dolomite with said stripped liquor.

5. The continuous process of recovering magnesia substantially free of calcium from dolomite which includes the steps of hard-burning dolomitic limestone until its carbon dioxide content is less than 0.25%, fine-grinding the burned dolomitic limestone, contacting said burned ground limestone with ammonia and carbon dioxide free ammonium chloride solution within less than five hours of said grinding and at a temperature below 160° F., separating a slurry of solids from said contacting, contacting said slurry with further similarly pure ammonium chloride solution at a temperature in excess of 160° F., and recovering substantially calcium-free magnesia from said second contacting.

RICHARD E. HULME.

REFERENCES CITED

The following references are of record in the file of this patent:

UNITED STATES PATENTS

| Number | Name | Date |
|---|---|---|
| 1,156,662 | Brodburn | Oct. 12, 1915 |
| 1,816,996 | Barrett | Aug. 4, 1931 |
| 1,880,315 | Cratogino | Oct. 4, 1932 |
| 1,893,047 | Barrett | Jan. 3, 1933 |
| 1,894,184 | Loomis | June 10, 1933 |
| 2,215,966 | Lee et al. | Sept. 24, 1940 |

FOREIGN PATENTS

| Number | Country | Date |
|---|---|---|
| 205,078 | Great Britain | Oct. 2, 1923 |
| 301,751 | Great Britain | Dec. 3, 1928 |

OTHER REFERENCES

Information Circular, "Economic Consideration in the Recovery of Magnesia from Dolomite," August 1943, I. C. 7247, pages 5, 12, 27, 31, 33. Published by the Dept. of Interior.